(154.)
ALBERT H. MERSHON.
Damper for Hot Air Furnaces.
No. 4,695. Reissued Jan. 2, 1872.
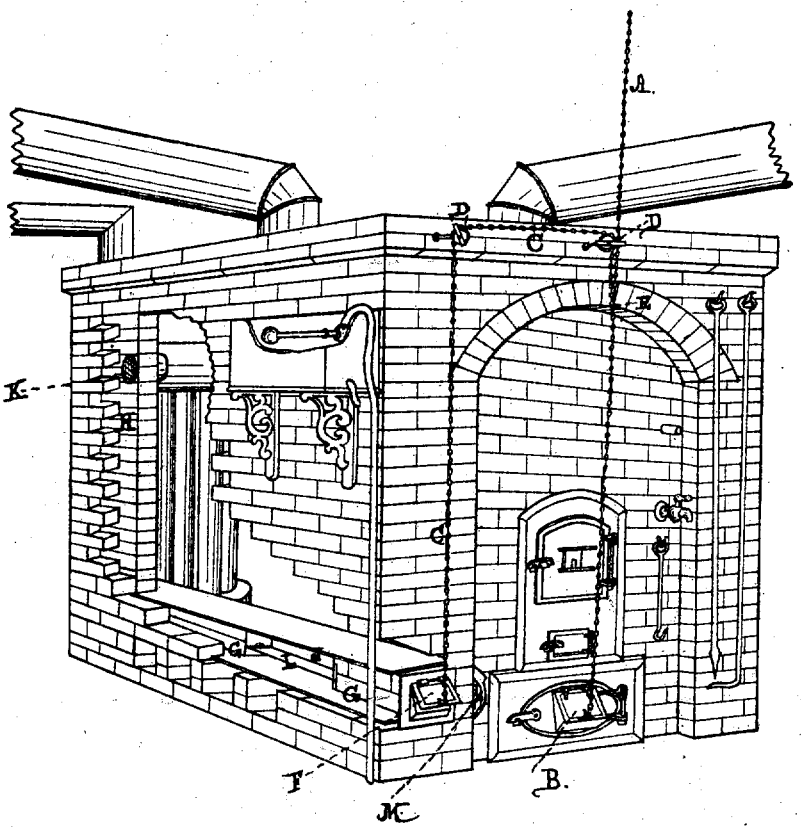
Witnesses:
Percy V. Kneass.
Jacob E. Schiedt
Inventor:
Albert H. Mershon
by John A. Wiederhein
Atty.
AM. PHOTO-LITHOGRAPHIC CO. N.Y. (OSBORNE'S PROCESS)

UNITED STATES PATENT OFFICE.

ALBERT H. MERSHON, OF PHILADELPHIA, PENNSYLVANIA.

IMPROVEMENT IN DAMPERS FOR HOT-AIR FURNACES.

Specification forming part of Letters Patent No. 77,512, dated May 5, 1868; reissue No. 4,695, dated January 2, 1872.

*To all whom it may concern:*

Be it known that I, ALBERT H. MERSHON, of the city and county of Philadelphia and State of Pennsylvania, have invented new and useful Improvements in Dampers for Hot-Air Furnaces; and I do hereby declare the following to be a clear and exact description of the nature thereof, sufficient to enable others skilled in the art to which my invention appertains to fully understand and use the same, reference being had to the accompanying drawing making part of this specification, in which the figure is a perspective view partly broken away.

This invention consists in combining the draught-door and flue-door of a hot-air furnace, the draught-door having an elevating and lowering connection operated by hand, to which is attached the operating connection of the flue-door whereby the fire of the furnace may be nicely regulated, as will be set forth. It further consists in the flue-door, a flue and damper operating together for the regulation of the draught at the exit-pipe.

Referring to the drawing, A represents a chain connected to the draught-door B, and it may be arranged and operated in a manner similar to that shown in my Letters Patent dated May 29, 1866. C is a chain passing over pulleys D, and connected at one end to the chain A at a point, E, at a distance below the pulleys greater than the range of motion of the flue-door F, to which the other end of the chain C is secured. The doors B F close by their own weight when there is no tension on the chains to which they are respectively attached, but the flue-door F is lighter than the draught-door B. It will be seen that raising the chain A will open the draught-door, permitting the flue-door to close, while lowering the chain will cause a reverse operation of the doors. G represents a flue, to which the door F belongs, and which communicates with the furnace-flue H. J is the ash-pit, K the exit-pipe of the furnace, and L the damper, which is opened or closed at pleasure by means of a suitably-arranged handle, and serves to separate the flue G from the ash-pit. The damper is always closed except when the fire is raked; then it is opened to allow the dust to pass into the flue G, from which it is removed at pleasure through the door F.

The operation is as follows: When the draught-door is closed the flue-door is opened. This admits a body of cold air into the flue G, and it passes into the furnace-flue H, (the damper being closed,) thereby checking the draught of the furnace at the pipe K. Again, the draught-door being opened, the chain C is slackened and the flue-door closes by its weight, thus permitting an uninterrupted draught through the furnace, drums, and pipe K into the flue H.

What I claim as new, and desire to secure by Letters Patent, is—

1. In a hot-air furnace, the draught-door and flue-door, in combination with an elevating and lowering connection, operated by hand, for the draught-door, and a connection for the flue-door attached to said elevating and lowering connection, when adapted for joint operation, in the manner herein described.

2. The chain A and draught-door B, in combination with the chain C and flue-door F together, substantially as described.

3. The door F, flue G, and damper L, for operation with the exit-pipe K, substantially as and for the purpose described.

A. H. MERSHON.

Witnesses:
JOHN A. WIEDERSHEIM,
PERCY V. KNEASS.

(154)